United States Patent [19]
Whelan

[11] Patent Number: 6,092,861
[45] Date of Patent: Jul. 25, 2000

[54] AIR DRAG REDUCTION UNIT FOR VEHICLES

[76] Inventor: William Whelan, P.O. Box # 250, P. Bur., Canada, N0G 1T0

[21] Appl. No.: 09/360,447

[22] Filed: Jul. 26, 1999

[51] Int. Cl.[7] .................................................. B62D 35/00
[52] U.S. Cl. ..................................... 296/180.2; 296/180.4
[58] Field of Search .............................. 296/180.1, 180.4, 296/180.2

[56] References Cited

U.S. PATENT DOCUMENTS

| | | | |
|---|---|---|---|
| 3,239,267 | 3/1966 | Reynolds | 296/180.4 X |
| 4,057,280 | 11/1977 | MacCready, Jr. et al. | |
| 4,142,755 | 3/1979 | Keedy | 296/180.4 X |
| 4,257,641 | 3/1981 | Keedy | 296/180.4 |
| 4,458,936 | 7/1984 | Mulholland | 296/180.4 |
| 4,688,841 | 8/1987 | Moore | |
| 4,741,569 | 5/1988 | Sutphen | 296/180.4 |
| 4,818,015 | 4/1989 | Scanlon | 296/180.1 |
| 4,867,397 | 9/1989 | Pamadi et al. | |
| 5,108,145 | 4/1992 | Harris | |
| 5,240,306 | 8/1993 | Flemming | |
| 5,280,990 | 1/1994 | Rinard | |
| 5,289,997 | 3/1994 | Harris | |
| 5,332,280 | 7/1994 | DuPont et al. | 296/180.4 X |

*Primary Examiner*—Joseph D. Pape
*Attorney, Agent, or Firm*—Donald E. Hewson; Marks & Clerk

[57] ABSTRACT

An air drag reducing apparatus is mounted on the rearward surface of a large vehicle. The apparatus comprises first and second pairs of identical panels having a base edge and first and second side edges extending from the base edge, and mating hinge plates and hinge pin. The base edges of the first pair of panels are adapted for mounting to one of the opposed vertical side edges of the rearward surface of the large vehicle and the base edges of the second pair of panels are adapted for mounting to one of the upper and lower side edges of the rearward surface. The second side edge of each of the first pair of panels is hingedly connected to the first side edge of a respective one the second pair of panels so as to form one of two fold-away portions of the apparatus. Each of the panels is symmetric about a respective axis of symmetry. At least one of the angles formed between the edges of the panels and the sides of the rearward surface of the vehicle is between 18 and 30 degrees. When mounted, the air drag reducing apparatus has the configuration of a horizontally directed pyramid, which may be truncated.

9 Claims, 4 Drawing Sheets

AIR DRAG REDUCTION UNIT FOR VEHICLES

FIELD OF THE INVENTION

This invention relates to a device for air drag reduction on vehicles. In particular, this invention relates to such a device which may be easily mounted and dismounted to and from a vehicle, and which may be easily erected to its working configuration. Moreover, the air drag reduction device of the present invention is such that when mounted to the rear surface of a vehicle, it may be easily collapsed from its working configuration to a folded, storage, configuration, so as to allow easy access to the rear surface of the vehicle.

BACKGROUND OF THE INVENTION

The use of air drag reducing device on large vehicles is well known throughout the trucking and transportation industries. These devices are known to be both flexible and rigid and are mountable on the frontward, sideward, or rearward surfaces of a vehicle, or combinations thereof. These devices are designed to reduce the air drag experienced by large vehicles by streamlining the air flow around the vehicle. The desire to reduce drag, specifically that drag associated with the rearward surface of the vehicle, is the focus of this invention. Limitations of the prior art encompass difficulties in terms of accessibility of rearward surface doors. It is a key feature of the present invention to facilitate accessibility to the rearward surface of a vehicle such that access to a rearward door will not be hindered.

An air drag reducing apparatus in keeping with the present invention avoids the previously described limitations of the prior art. An air drag reducing apparatus such as this comprises first and second pairs of identical panels, and hinge means. Each respective panel has at least three sides having a base edge, and first and second side edges extending from the respective base edge. The second side edge of each of the first pair of identical panels is hingedly connected to the first side edge of a respective one of the second pair of identical panels. These hingedly connected panels form two fold-away portions of the air drag reducing apparatus. When deployed, the abutting edges of the two fold-away portions of the air drag reducing apparatus are secured to one another by any appropriate means as is apparent to one skilled in the art. When not in use these panels can be folded against the side of a vehicle. When mounted on the rearward surface of the vehicle on which they are mounted, these panels form a horizontally directed pyramid and allow for smooth laminar air flow around the vehicle, thereby reducing drag. Vehicles that are particularly suited for the application of an air drag reducing apparatus in keeping with the present invention includes buses, motorized recreational vehicles, transport trucks, recreational trailers, cargo trailers, and cube vans.

DESCRIPTION OF THE PRIOR ART

U.S. Pat. No. 4,057,280 issued to MacCREADY and LISSAMAN teaches the use of molded projections which are mounted at various corners of a truck body. The projections may have further vanes or deflectors mounted on them. The purpose of the projections is essentially to streamline the truck body, by preventing, reducing, or delaying the separation of the flow boundary layer of air flowing over the truck body as the truck body moves forwardly. The projections can be placed along the top edges of the truck body, and at the rear vertical edges as well, to reduce side thrust exerted by sideward wind gusts.

U.S. Pat. No. 4,688,841 issued to MOORE provides an inflatable structure which is made of fabric and which is mounted on the rear vertical surface of the trailer. Obviously, the structure is such that it must be removed before the rear doors of the trailer can be opened. The structure self-inflates due to the pressure differential between the outer and inner surfaces of the fabric, which pressure differential is created as a consequence of the forward movement of the vehicle, and the creation of a low pressure zone at the rear of the vehicle. The fabric of the self-inflating structure is, of course, of low porosity but sufficient flexibility to permit the self-inflating action. When the drag reduction device has inflated, a smooth surface is provided which reduces eddy currents and other flow aberrations at the rear of the vehicle as it moves through the air.

PAMADI and TAYLOR Jr., U.S. Pat. No. 4,867,397 teaches vertical panels that are provided on the forward surface of a vehicle, to act as a flow separator, and thereby reducing aerodynamic drag.

HARRIS U.S. Pat. No. 5,108,145 provides a drag reduction product by which a substantially planar structure may be mounted on the rear surface of the vehicle. When the rear surface comprises a pair of doors, the structure is easily accommodated by mounting it directly to the doors. However, what this structure provides is a plurality of cavities or projections, each of which comprises only a small portion of the total area of the rear surface, and each of which contributes to drag reduction—apparently by inhibiting the turbulence which would otherwise occur at the rear surface of the vehicle.

U.S. Pat. No. 5,240,306 issued to FLEMMING teaches a drag reduction fairing which is mounted to the rear of a vehicle, and which essentially streamlines the structure. However, it is stated that the operation of the device is not fully understood, but it is believed that the shape co-operates with the ground effect to cause a high pressure in the air impinging upon the rear surface of the vehicle, and moderation of the flow of air off the vehicle with a total resultant of drag reduction. The structure of the fairing body may be either rigid plastic, or it may be formed from flexible fabric; in either case, it has to be at least partially removed so as to allow access to the rear doors of the vehicle.

RINARD U.S. Pat. No. 5,280,990 teaches the provision of a plurality of vertical vanes at the rear corners of the vehicle. In particular, the vanes are mounted across the upper and lower edges of the rear surface of the vehicle; there may also be vertical rear air deflection vanes mounted at the sides of the rear surface of the vehicle. The patent also teaches the use of a forward facing nose cone at the front of the trailer to which the drag reduction system is being fitted. Drag is reduced by disturbing the air flow at the rear of the vehicle, as the vehicle moves forwardly.

Finally, U.S. Pat. No. 5,289,997 issued to HARRIS is a Continuation-In-Part application of U.S. Pat. No. 5,108,145. There is some commonality as to the teachings, but quite a number of differences. In any event, once again, this patent teaches the application of a number of eddy reducing projections or cavities at the rear surface of a vehicle. The patent requires that each of the structure elements—the cavities or projections—must have a dimension perpendicular to the rear panel of about 10% up to 14% of the average cross-sectional dimension of the drag reducing structure at the surface of the flat rear panel of the vehicle.

SUMMARY OF THE INVENTION

In accordance with one aspect of the present invention, there is provided an apparatus for reducing air drag on vehicles. The apparatus comprises a first pair of identical panels having at least three sides, the base edge of the panels being adapted for mounting to the vertical side edges of the rearward surface of a vehicle. There is a second pair of identical panels having at least three sides, the base edge of the panels being adapted for mounting to the upper and lower horizontal edges of the rearward surface of the vehicle. Each of the first and second pairs of identical panels have first and second side edges extending from the respective base edge. There are also hinge means, each comprising two mating hinge plates and a hinge pin.

Each of the first pair of identical panels and each of the second pair of identical panels is symmetric about a respective axis of symmetry.

The second side edge of each of the first pair of identical panels is hingedly connected to the first side edge of a respective one of the second pair of identical panels so as to form one of two fold-away portions of the air drag reducing apparatus. The base edges of the first pair of identical panels are hingedly connected to a respective one of the opposed vertical side edges of the rearward surface of the vehicle. When deployed, the abutting edges of the two fold-away portions of the air drag reducing apparatus are secured to one another by any appropriate means as is apparent to one skilled in the art.

Each of the first pair of identical panels has first and second ends, and the first end of each of the first pair of identical panels is defined by the base edge. The second end is remote from the first end of each of the first pair of identical panels, along the respective axis of symmetry. Each of the second pair of identical panels has first and second ends, and the first end of each of the second pair of identical panels is defined by the base edge. The second end is remote from the first end of each of the second pair of identical panels, along the respective axis of symmetry.

The first and second side edges of the first pair of identical panels each form a first angle with the upper and lower horizontal side edges of the rearward surface of the vehicle. The first and second side edges of the second pair of identical panels each form a second angle with the opposed vertical side edges of the rearward surface of the vehicle. Of these two angles formed, at least one of the first and second angles is between 18 and 30 degrees.

In a particular embodiment of the present invention, each of the first pair of identical panels and each of the second pair of identical panels is four-sided and trapezoidal. The first and second ends of each of the respective panels are parallel, and each of the panels is symmetric about its respective axis of symmetry. Together, the first pair of identical panels and the second pair of identical panels form a horizontally directed truncated pyramid. The end surface of this horizontally directed truncated pyramid, in one instance, is formed by a rectangular panel hingedly connected to the second end of one of the respective panels. In a second instance, this end surface of the horizontally directed truncated pyramid is formed as a rectangular plug.

The air drag reducing apparatus may be mounted on the rearward surface of a vehicle which may typically be one of the following: buses, motorized recreational vehicles, transport trucks, recreational trailers, cargo trailers, and cube vans.

The air drag reducing apparatus may be constructed from plastic, wood, metal, and combinations thereof, and forms a rigid structure for mounting on the rearward surface of vehicles.

To hingedly connect the first pair of identical panels to the rearward surface of a vehicle, a pair of hinge means are mounted on the base edge, or first end, of each the first pair of identical panels. Moreover, the hinge means is pivotable through at least 270 degrees about its respective hinge pin.

To hingedly connect one of the first pair of identical panels to one of the second pair of identical panels, a first pair of hinge means are mounted on the second side edge of one of the first pair of identical panels. A second pair of hinge means are mounted on the first side edge of one of the second pair of identical panels. The opposing pairs of hinge means connect one of the first pair of identical panels to one of the second pair of identical panels. Each pair of hinge means is pivotable about its respective hinge pin.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
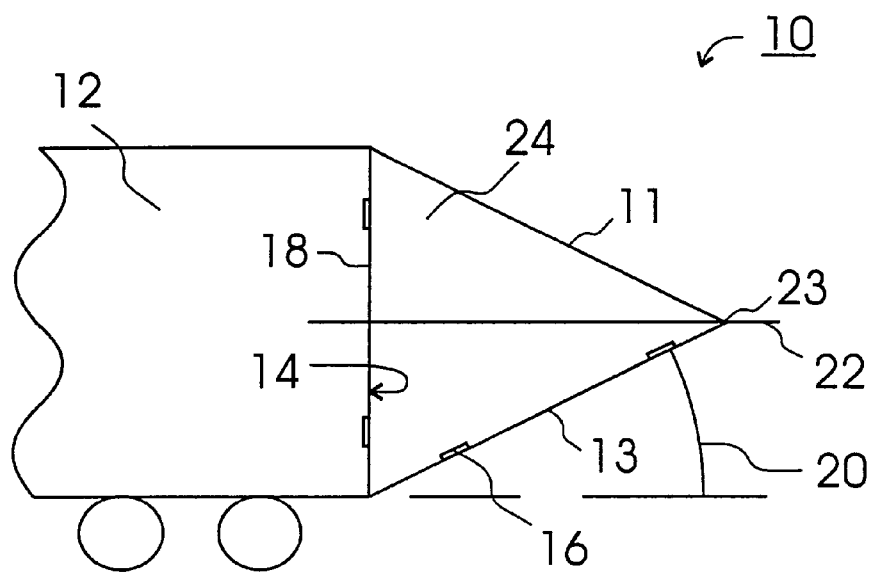
FIG. 1 is a side view of the configuration of a first embodiment of the air drag reducing apparatus of the present invention mounted on the rearward surface of a vehicle.

Referring now to the drawings, there is illustrated an air drag reducing apparatus for use on the rearward surface of a vehicle, generally designated by reference numeral 10. An alternative embodiment 50 is discussed hereafter. The air drag reducing apparatus 10, shown in general configuration in FIG. 1, is shown in conjunction with the rear portion of a vehicle 12. The air drag reducing apparatus 10 is mounted on the rearward surface 14 of the vehicle 12. The air drag reducing apparatus comprises a first pair of identical panels 24, a second pair of identical panels 26 (shown in FIG. 3), and hinge means 16. Each of the first pair of identical panels 24 has first and second side edges 11, 13 extending from the respective base edge 18, and each panel is symmetric about a respective axis of symmetry 22. Each of the second pair of identical panels 26 has first and second side edges 15, 17 extending from the respective base edge 28, and each panel is symmetric about a respective axis of symmetry 32. The first and second side edges 11, 13 of the first pair of identical panels 24 each form a first angle 20 with the upper and lower horizontal edges of the rearward surface 14 of the vehicle 12. The first and second side edges 15, 17 of the second pair of identical panels 26 each form a second angle 31 (shown in FIG. 5) with the opposed vertical side edges of the rearward surface 14 of the vehicle 12. Of these two angles formed, at least one of the first and second angles 20, 32 is between 18 and 30 degrees.

When mounted on the rearward surface 14 of the vehicle 12, the pairs of panels 24, 26 form a horizontally directed pyramid.

Figure 2:
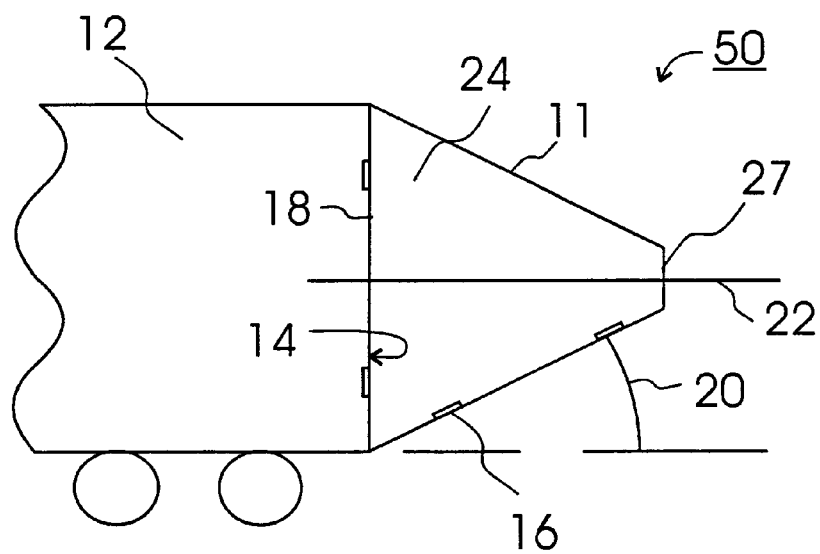
FIG. 2 is a side view of an alternative embodiment of FIG. 1.

FIG. 2 shows an alternative embodiment of air drag reducing apparatus 50. In this instance, each of the first pair 24, and second pair 26, of identical panels is four-sided and trapezoidal. Together, each of the first pair of identical panels 24 and the second pair of identical panels 26 form a horizontally directed truncated pyramid.

Figure 3:
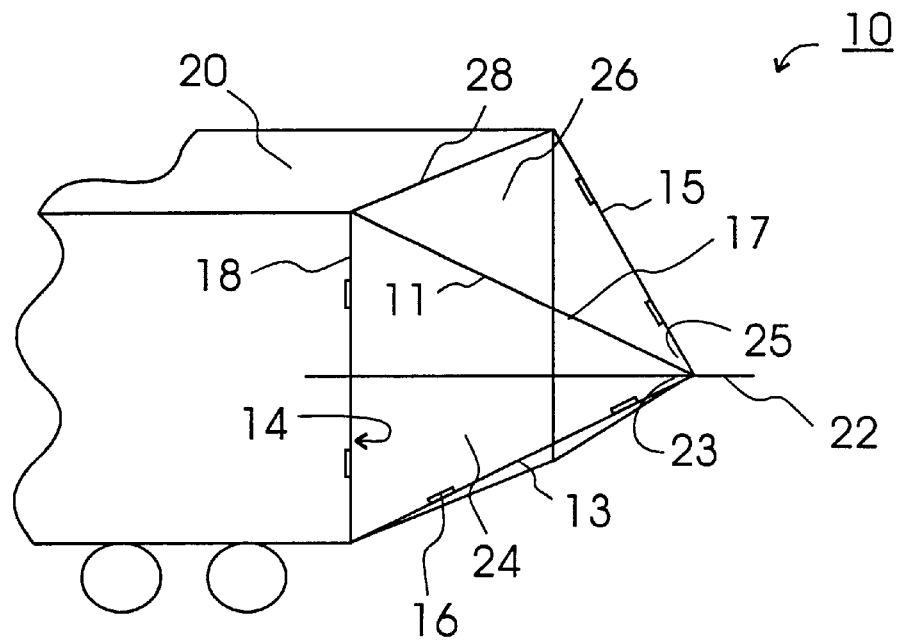
FIG. 3 is a perspective view of the first embodiment of the air drag reducing apparatus mounted on the rearward surface of a vehicle.

Referring now to FIG. 3, a perspective view of the air drag reducing apparatus 10 is shown. A first pair of identical panels 24 is shown, each having three sides, of which the base edge 18 of the panels is adapted for mounting to the vertical side edges of the rearward surface 14 of the vehicle 12. A second pair of identical panels 26 is also shown, each having three sides, of which the base edge 28 of the panels is adapted for mounting to the upper and lower horizontal edges of the rearward surface 14 of the vehicle 12. The second side edge 13 of each of the first pair of identical panels 24 is hingedly connected by hinge means 16 to the first side edge 15 of a respective one of the second pair of identical panels 26, so as to form one of two fold-away portions 34 (shown in FIG. 7) of the air drag reducing apparatus 10. The base edges 18 of the first pair of identical panels 24 are hingedly connected by hinge means 16 to a respective one of the opposed vertical side edges of the rearward surface 14 of the vehicle 12. When deployed, the abutting edges of the two fold-away portions 34, of the air drag reducing apparatus 10, are secured to one another by any appropriate means as is apparent to one skilled in the art. Each of the first pair of identical panels 24 has first and second ends, and the first end of each of the first pair of identical panels is defined by the base edge 18. The second end 23 is remote from the first end 18 of each of the first pair of identical panels 24 along the respective axis of symmetry 22. Each of the second pair of panels 26 has first and second ends, and the first end of each of the second pair of identical panels 26 is defined by the base edge 28. The second end 25 is remote from the first end 28 of each of the second pair of identical panels 26 along the respective axis of symmetry 32.

Figure 4:
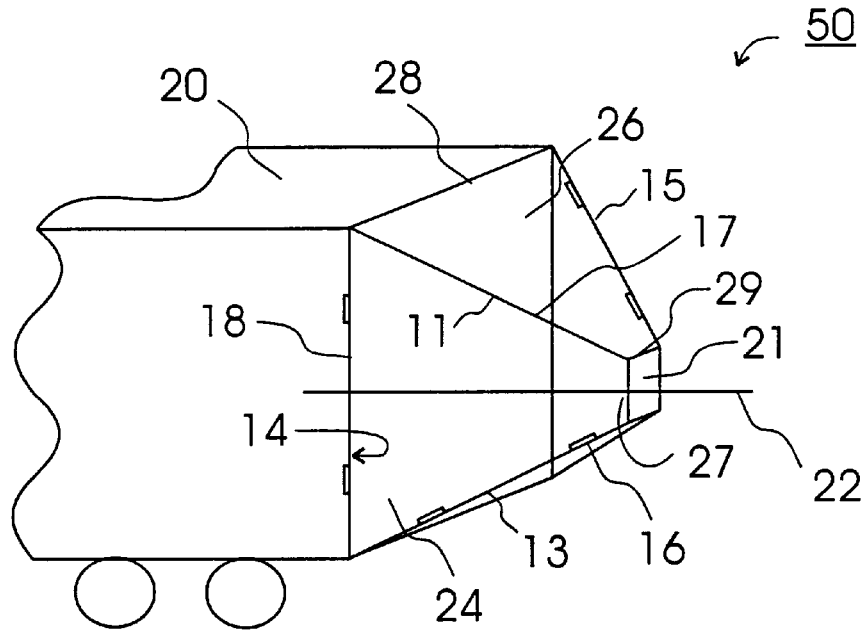
FIG. 4 is a perspective view similar to FIG. 3, showing the alternative embodiment of the air drag reducing apparatus mounted on the rearward surface of a vehicle.

FIG. 4 shows a perspective view of the alternative embodiment of air drag reducing apparatus 50. The first ends 18, 28 and second ends 27, 29 of each of the respective panels are parallel. The end surface of the truncated pyramid formed by the first pair of identical panels 24 and second pair of identical panels 26, is shown at 21, and may be a rectangular panel hingedly connected to the second end 27, 29 of one of the respective panels. Alternatively, the end surface 21 of the horizontally directed truncated pyramid may be formed as a rectangular plug.

Figure 5:
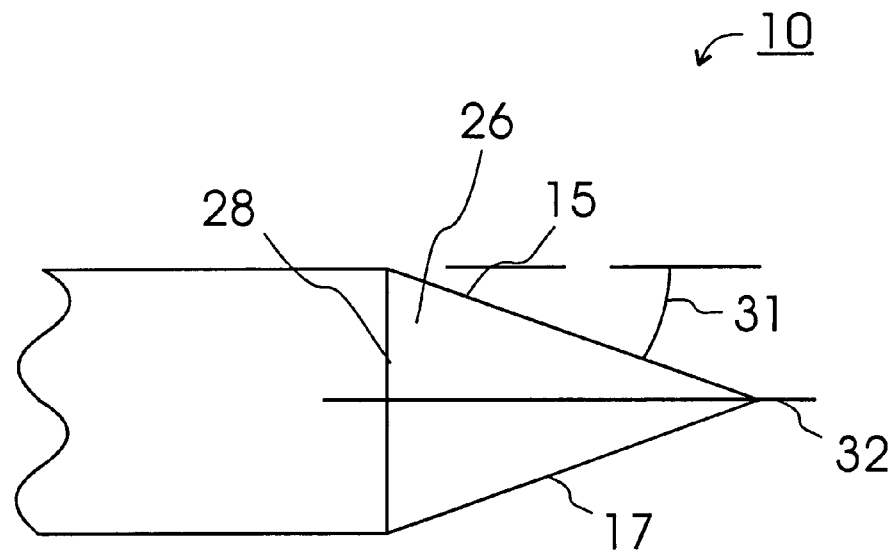
FIG. 5 is a top view of the first embodiment of the air drag reducing apparatus mounted on the rearward surface of a vehicle.

The air drag reducing apparatus 10 is shown in a top view in FIG. 5. This view illustrates the configuration of the second pair of identical panels 26 mounted on the rearward surface 14 of the vehicle 12. Each of the second pair of identical panels 26 is symmetric about the respective axis of symmetry 32, and each of the first and second side edges 15, 17 of the panels forms a second angle 31 with the vertical side edges of the rearward surface 14 of the vehicle 12.

Figure 6:
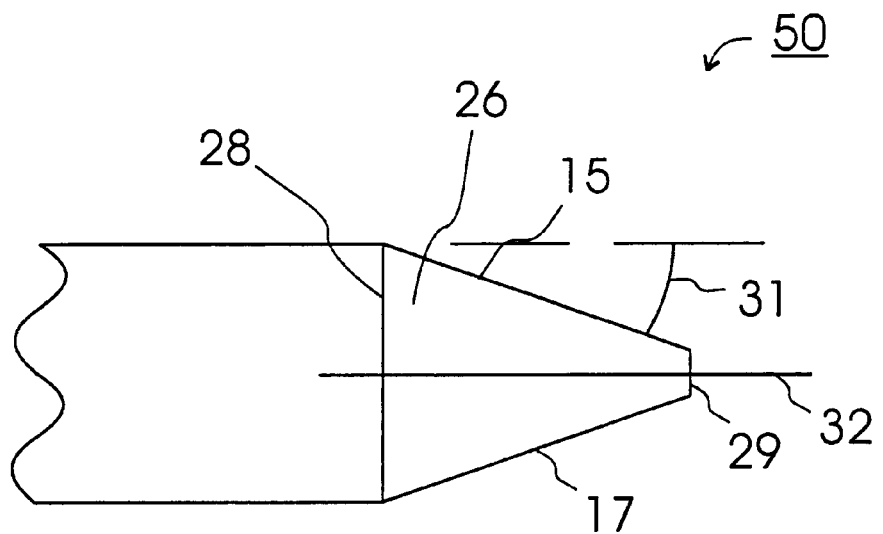
FIG. 6 is a top view of the alternative embodiment of the air drag reducing apparatus mounted on the rearward surface of a vehicle.

FIG. 6 shows a top view of the alternative embodiment of air drag reducing apparatus 50.

Figure 7:
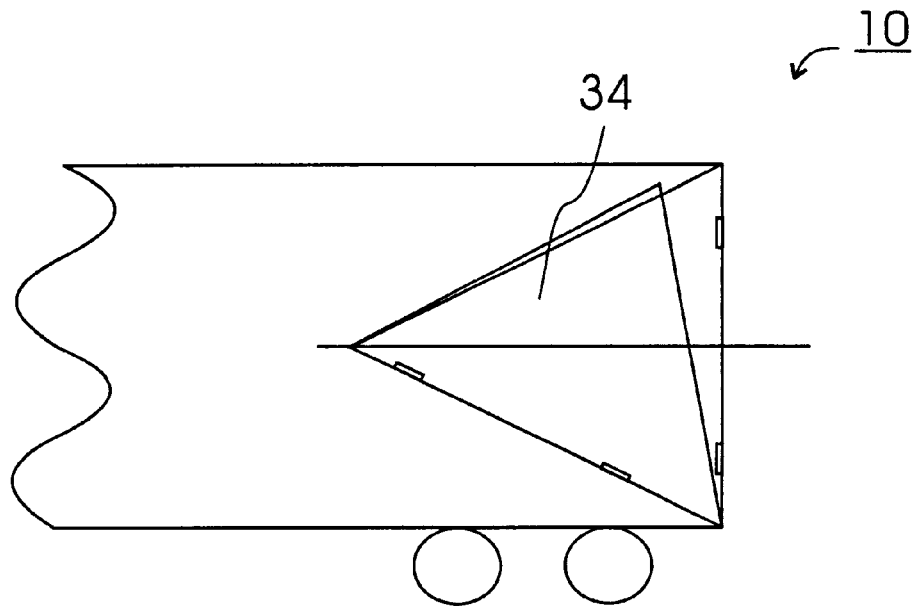
FIG. 7 is a side view of the folded configuration of the first embodiment of the air drag reducing apparatus mounted on the rearward surface of a vehicle.

Referring now to FIG. 7, a side view of the folded configuration 34 of the air drag reducing apparatus is shown. The second side edge 13 of each of the first pair of identical panels 24 is hingedly connected by hinge means 16 to the first side edge 15 of a respective one of the second pair of identical panels 26, so as to form one of two fold-away portions 34 of the air drag reducing apparatus 10. The fold-away portion 34 is flush against the sideward surface of the vehicle where it is secured by suitable means such that the vehicle may be driven with the panels in the folded configuration.

In general, the hinge means 16 are conventional hinge means comprising two hinge plates and a hinge pin about which the hinge plates rotate. The range of rotation about each respective hinge pin may be between 0 and 360°. Rotation is about the longitudinal axis of the hinge. The pairs of hinge means 16 mounted on the second side edge 13 of one of the first pair of identical panels 24 and on the first side edge 15 of a respective one of the second pair of identical panels 26 are pivotable through at least 270° about the respective hinge pins. It is evident that the requirement for at least 270° of rotation allows for the first pair and second pair of identical panels 24, 26 to be easily erected from the folded storage configuration 34 to the working configuration 10. At least two of the hinge means 16 are mounted on each of said base edges 18 of each of said first pair of identical panels 24 so as to allow the first pair of identical panels 24 of the air drag reduction apparatus 10 to be placed in its folded configuration 34. Each of the hinge means 16 is mounted on each of said base edges 18 of each of said first pair of identical panels is pivotable through at least 270° about its respective hinge pin.

Figure 8:
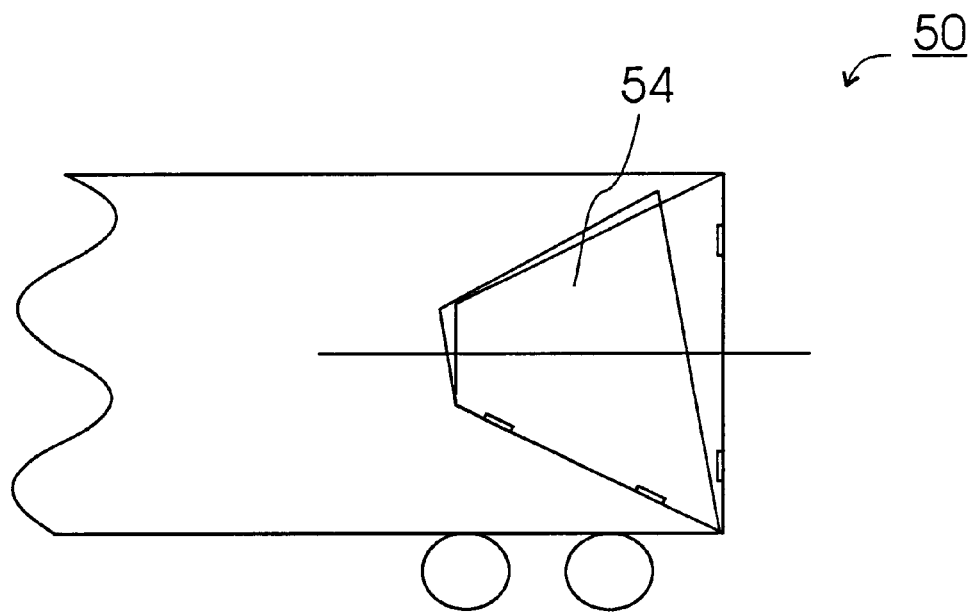
FIG. 8 is a side view similar to FIG. 7, showing the folded configuration of the alternative embodiment of the air drag reducing apparatus mounted on the rearward surface of a vehicle.

FIG. 8 shows a side view of the alternative embodiment of air drag reducing apparatus 50, which is otherwise as described in FIG. 7. The fold-away portion 54 is flush against the sideward surface of a vehicle where it is secured by suitable means such that the vehicle may be driven with the panels in the folded position.

The general purpose for the device in keeping with the present invention is to reduce drag on the rearward surface of larger vehicles. It is evident that the device remains mounted on the large vehicle in both its working configuration and collapsed configuration. The device, as discussed, is mounted on the rearward surface of the vehicle and forms a rigid structure which may be constructed from plastic, wood, metal or combinations thereof.

The air drag reducing apparatus in keeping with the present invention is particularly suited for application on vehicles including buses, motorized recreational vehicles, transport trucks, recreational trailers, cargo trailers, and cube vans.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An air drag reducing apparatus for mounting on the rearward surface of a vehicle, wherein said rearward surface of said vehicle on which said air drag reducing apparatus is to be mounted is substantially rectangular with opposed vertically disposed side edges and opposed horizontally disposed upper and lower edges;

said air drag reducing apparatus comprising:

a first pair of identical panels each having at least three sides, wherein each of said first pair of identical panels has a base edge, and each of said first pair of identical panels has first and second side edges extending from the respective base edge, wherein each respective base edge is adapted to be hingedly mounted to one of said opposed vertical side edges of said rearward surface of said vehicle; and wherein each respective base edge spans the full vertical height of said side edges of said rearward surface to which said panel is mounted;

a second pair of identical panels each having at least three sides, wherein each of said second pair of identical panels has a base edge, and each of said second pair of identical panels has first and second side edges extending from the respective base edge, wherein each respective base edge is parallel to one of said upper and lower horizontal edges of said rearward surface of said vehicle; and wherein each respective base edge spans the full horizontal width of said upper and lower edges of said rearward surface to which said panel is parallel; and hinge means comprising two mating hinge plates and a hinge pin;

wherein each of said first pair of identical panels and each of said second pair of identical panels is symmetric about a respective axis of symmetry;

wherein said second side edge of each of said first pair of identical panels is hingedly connected to said first side edge of a respective one of said second pair of identical panels so as to form one of two fold-away portions of said air drag reducing apparatus; and wherein said first and second side edges of each of said panels are designated such that said first side edge of either of said first pair of identical panels is adjacent to said second side edge of either of said second pair of identical panels; and said second side edge of either of said first pair of identical panels is adjacent to said first side edge of either of said second pair of identical panels;

wherein each of said base edges of said first pair of identical panels is hingedly connected to a respective one of said opposed vertical side edges of said rearward surface of said vehicle;

wherein said first pair of identical panels has first and second ends; wherein said first end of each of said first pair of identical panels is defined by the base edge and the second end is remote from the first end of each of said first pair of identical panels along its respective axis of symmetry;

wherein said second pair of identical panels has first and second ends; wherein said first end of each of said second pair of identical panels is defined by the base edge and the second end is remote from the first end of each of said second pair of identical panels along its respective axis of symmetry;

wherein said first and second sides edges of each of said first pair of identical panels form a first angle with said upper and lower horizontal side edges of said rearward surface of said vehicle;

wherein said first and second side edges of each of said second pair of identical panels form a second angle with said opposed vertical side edges of said rearward surface of said vehicle; and wherein at least one of said first and second angles is between 18 and 30 degrees.

2. The air drag reducing apparatus of claim 1, wherein each of said first pair of identical panels and each of said second pair of identical panels is 4-sided and trapezoidal, and wherein said first end and said second end of each of said panels are parallel, and wherein each of said panels is symmetric about its respective axis of symmetry.

3. The air drag reducing apparatus of claim 2, wherein said first pair of identical panels and said second pair of identical panels together form a horizontally directed truncated pyramid.

4. The air drag reducing apparatus of claim 3, wherein said horizontally directed truncated pyramid has a rectangular panel hingedly connected to a second end of one of said panels; and wherein said rectangular panel provides an end surface for said horizontally directed truncated pyramid.

5. The air drag reducing apparatus of claim 3, wherein said horizontally directed truncated pyramid has a rectangular plug such that it provides an end surface to said horizontally directed truncated pyramid.

6. The air drag reducing apparatus of claim 1, wherein each of said panels is constructed of a material chosen from the group consisting of plastic, wood, metal, and combinations thereof.

7. The air drag reducing apparatus of claim 1, wherein said vehicle on which said air drag reducing apparatus is mounted is selected from the group consisting of buses, motorized recreational vehicles, transport trucks, recreational trailers, cargo trailers, and cube vans.

8. The air drag reducing apparatus of claim 1, wherein at least two of said hinge means are mounted on each of said base edges of each of said first pair of identical panels so as to hingedly connect said first pair of identical panels to said rearward surface of said vehicle; wherein each of said hinge means is pivotable though at least 270 degrees about its respective hinge pin.

9. The air drag reducing apparatus of claim 1, wherein a pair of said hinge means are mounted on said second side edge of one of said first pair of identical panels, a second and mating pair of said hinge means are mounted on said first side edge of one of said second pair of identical panels, adjacent to said first side edge of said first pair of identical panels, and said first pair of hinge means and said second pair of mating hinge means hingedly connect one of said first pair of identical panels to a respective one of said second pair of identical panels; and wherein said first pair and said second pair of hinge means is pivotable through at least 270° about its respective hinge pin.

* * * * *

UNITED STATES PATENT AND TRADEMARK OFFICE
CERTIFICATE OF CORRECTION

PATENT NO. : 6,092,861
DATED : July 26, 1999
INVENTOR(S) : William Whelan

It is certified that error appears in the above-identified patent and that said Letters Patent is hereby corrected as shown below:

<u>Title page,</u>
Item [76], the inventor's address is hereby corrected as shown below:
-- 51 Wellington Street, P.O. Box #250, Port Burwell, Ontario, Canada N0J1T0 --.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*